(12) United States Patent
Vyas et al.

(10) Patent No.: US 11,267,462 B2
(45) Date of Patent: Mar. 8, 2022

(54) AUTOMOTIVE ANALYTICS TECHNOLOGY TO PROVIDE SYNERGISTIC COLLISION SAFETY

(71) Applicant: Intel Corporation, Santa Clara, CA (US)

(72) Inventors: Harshal B. Vyas, Folsom, CA (US); Katalin K. Bartfai-Walcott, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 16/500,065

(22) PCT Filed: Apr. 1, 2017

(86) PCT No.: PCT/US2017/025639
§ 371 (c)(1),
(2) Date: Oct. 1, 2019

(87) PCT Pub. No.: WO2018/182747
PCT Pub. Date: Oct. 4, 2018

(65) Prior Publication Data
US 2020/0070817 A1    Mar. 5, 2020

(51) Int. Cl.
*B60W 30/09* (2012.01)
*B60R 21/015* (2006.01)
(Continued)

(52) U.S. Cl.
CPC ....... *B60W 30/09* (2013.01); *B60R 21/01542* (2014.10); *B60W 40/09* (2013.01);
(Continued)

(58) Field of Classification Search
CPC .... B60R 21/01542; B60W 2040/0827; B60W 2040/0872; B60W 2520/06;
(Continued)

(56) References Cited

U.S. PATENT DOCUMENTS 6,961,661 B2 * 11/2005 Sekiguchi .......... B60K 31/0008
701/301
6,968,266 B2 * 11/2005 Ahmed-Zaid ...... B60K 31/0008
701/96
(Continued)

FOREIGN PATENT DOCUMENTS

| DE | 10336743 A1 | 3/2004 |
| EP | 3006297 A1 | 4/2016 |
| WO | 2012043388 A1 | 4/2016 |

OTHER PUBLICATIONS

International Preliminary Report on Patentability for International Patent Application No. PCT/US2017/025639, dated Oct. 10, 2019, 7 pages.
(Continued)

*Primary Examiner* — Babar Sarwar
(74) *Attorney, Agent, or Firm* — Jordan IP Law, LLC (57) ABSTRACT

Systems, apparatuses and methods may provide for technology that conducts a real-time analysis of interior sensor data associated with a vehicle, exterior sensor data associated with the vehicle and environmental data associated with the vehicle. Additionally, the technology may determine whether a hazard condition exists based on the real-time analysis, wherein the hazard condition includes a deviation of a current behavior waveform from a reference behavior waveform by a predetermined amount. In one example, a safety measure is triggered with respect to the vehicle if the hazard condition exists. The safety measure may be selected based on a reaction time constraint associated with the hazard condition.

24 Claims, 7 Drawing Sheets

(51) Int. Cl.
*B60W 40/09* (2012.01)
*B60W 40/08* (2012.01)

(52) U.S. Cl.
CPC ............... *B60W 2040/0827* (2013.01); *B60W 2040/0872* (2013.01); *B60W 2520/105* (2013.01); *B60W 2540/30* (2013.01); *B60W 2554/00* (2020.02); *B60W 2555/20* (2020.02); *B60W 2556/45* (2020.02); *B60W 2710/30* (2013.01)

(58) Field of Classification Search
CPC ....... B60W 2520/10; B60W 2520/105; B60W 2520/18; B60W 2540/18; B60W 2540/221; B60W 2540/223; B60W 2540/225; B60W 2540/229; B60W 2540/30; B60W 2552/40; B60W 2554/00; B60W 2554/406; B60W 2555/20; B60W 2556/45; B60W 2556/65; B60W 2710/30; B60W 2756/10; B60W 30/09; B60W 40/09; B60W 50/14
See application file for complete search history.

(56) References Cited

U.S. PATENT DOCUMENTS

| | | | | |
|---|---|---|---|---|
| 7,124,027 | B1* | 10/2006 | Ernst, Jr | G01S 13/931 701/301 |
| 7,194,347 | B2* | 3/2007 | Harumoto | B60R 21/0132 701/45 |
| 8,489,318 | B2* | 7/2013 | Reinisch | B60T 8/17558 701/301 |
| 10,115,164 | B1* | 10/2018 | Binion | B60W 50/14 |
| 2004/0034460 | A1* | 2/2004 | Folkerts | B60W 10/11 701/54 |
| 2004/0193347 | A1* | 9/2004 | Harumoto | G08G 1/167 701/45 |
| 2012/0245758 | A1* | 9/2012 | Mizuta | B60W 40/09 701/1 |
| 2014/0222296 | A1* | 8/2014 | Takeuchi | F16H 59/00 701/48 |
| 2014/0324297 | A1* | 10/2014 | Kim | B60W 30/09 701/48 |
| 2015/0158499 | A1* | 6/2015 | Koravadi | G08G 1/164 701/23 |
| 2015/0166025 | A1* | 6/2015 | Nagatsuka | B60W 30/188 701/70 |
| 2015/0294547 | A1* | 10/2015 | Ito | G08G 1/165 340/576 |
| 2016/0023655 | A1* | 1/2016 | Makino | B62D 7/159 701/37 |
| 2017/0329332 | A1* | 11/2017 | Pilarski | B60W 30/0956 |
| 2017/0341612 | A1* | 11/2017 | Ohmori | B60W 50/12 |
| 2018/0273024 | A1* | 9/2018 | Umetsu | B62D 5/0463 |
| 2018/0308353 | A1* | 10/2018 | He | B60Q 9/00 |
| 2020/0070817 | A1* | 3/2020 | Vyas | B60W 30/09 |

OTHER PUBLICATIONS

International Search Report and Written Opinion for International Patent Application No. PCT/US2017/025639, dated Dec. 13, 2017, 14 pages.

* cited by examiner

AUTOMOTIVE ANALYTICS TECHNOLOGY TO PROVIDE SYNERGISTIC COLLISION SAFETY

CROSS REFERENCE TO RELATED APPLICATIONS

The present application is a U.S. National Phase Patent Application, which claims the benefit of priority to International Patent Application No. PCT/US2017/025639 filed on Apr. 1, 2017.

TECHNICAL FIELD

Embodiments generally relate to vehicular safety. More particularly, embodiments relate to automotive analytics technology to provide synergistic collision safety.

BACKGROUND

Vehicular safety solutions such as blind spot detection/notification systems and/or external proximity sensors may handle hazardous conditions in an isolated manner. As a result, suboptimal performance may be experienced.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
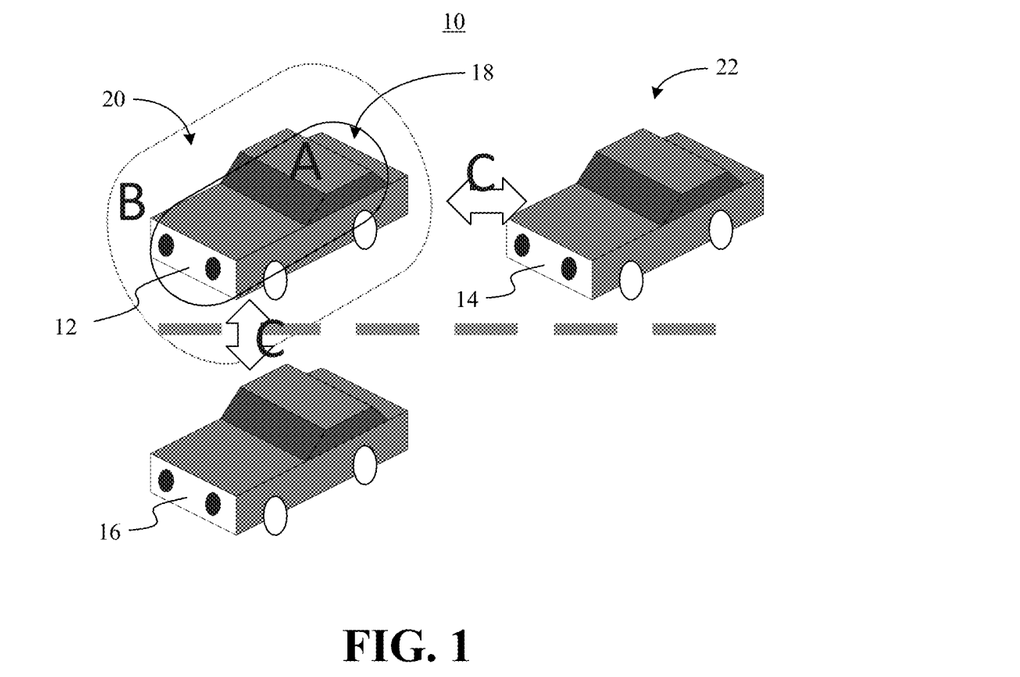
FIG. 1 is an illustration of an example of a plurality of data collection zones according to an embodiment.

Turning now to FIG. 1, an automotive environment 10 is shown in which a first vehicle 12 is being operated near a second vehicle 14 and a third vehicle 16 (e.g., in traffic). As will be discussed in greater detail, the first vehicle 12 may be equipped with technology to automatically avoid and/or mitigate collisions between the first vehicle 12 and other objects such as the second vehicle 14 and/or the third vehicle 16. Additionally, the collision avoidance and/or mitigation may be based on a wide variety of data from disparate sources within the first vehicle 12 and outside the first vehicle 12.

More particularly, the technology may establish a first data collection zone 18 (zone "A") for interior sensor data captured from sensors within and around the passenger cabin. The interior sensor data may include, for example, driver drowsiness data, seatbelt position data, occupant position data, object position data, driver interface data, occupant weight data, audio tone data, audio volume data, gaze direction data, driver response rate data, and so forth. Thus, the driver drowsiness data might be obtained from eye tracking sensors (e.g., detecting eyelid closure) and/or motion sensors (e.g., detecting head nodding) in the passenger cabin. Seatbelt position data may indicate whether seatbelts are locked and worn, locked and not worn, not locked and not worn, etc. The occupant position data may indicate the existence and location of passengers within the cabin (e.g., front seat, back seat). The object position data may identify objects (e.g., backpack in the passenger seat, cell phone on the dashboard) that might become projectiles in a collision, and so forth.

The driver interface data may indicate whether the driver is changing the radio station, adjusting the heating, ventilation and air condition (HVAC) settings, texting, and so forth. The audio tone and/or volume data may indicate an ongoing argument (e.g., that might distract the driver) and/or loud music (e.g., that may drown out sirens), etc. The gaze direction data may indicate, for example, whether the driver is looking at the road. The driver response rate data may indicate how quickly the driver has been responding to prompts and/or alerts. Other interior sensor data that "belongs" to the first vehicle 12 may also be accumulated from the first data collection zone 18.

Additionally, a second data collection zone 20 (zone "B") may accumulate exterior sensor data such as, for example, travel direction data, acceleration data, velocity data, wheel angle data, gravitational force (G force) data, lane position data, proximity data, tilt data, and so forth. The travel direction data may be in terms of absolute direction (e.g., north, south, east, west) and/or with respect to a reference point (e.g., away from home, towards the office). The wheel angle (e.g., vector) data may indicate the amount of change in wheel angle and/or the amount of time at a current wheel angle position. Other exterior sensor data that belongs to the first vehicle 12 may also be accumulated from the second data collection zone 20. The exterior sensor data may be collected from one or more sensors mounted to/within the body (e.g., outer shell, protective housing) of the first vehicle 12.

Moreover, the technology may establish a third data collection zone 22 (zone "C") for environmental data captured from other sources. The environmental data may include, for example, temperature data, humidity data, dew point data, light data (e.g., strength, color, dispersion), inter-vehicle communication data, road condition data, traffic data, weather data, natural disaster data (e.g., rockslide, snow, hurricane), time data, emergency vehicle data, and so forth. The inter-vehicle communication data may include messages from the second vehicle 14 and/or the third vehicle 16. In this regard, the vehicles 12, 14, 16 may subscribe to a proximity-based service that enables the drivers of the vehicles 12, 14, 16 to be made aware of safety concerns originating from nearby vehicles. For example, the third vehicle 16 might send a near field communications (NFC) notification to the first vehicle 14 indicating that the driver of the third vehicle 16 is distracted, falling asleep, etc. or that there is a mechanical concern with respect to the third vehicle 16 (e.g., bad brakes, faulty turn signal). In such a case, the first vehicle 12 may notify the driver of the first vehicle 12, automate a maneuver of the first vehicle 12 (e.g., slow down, change lanes), notify a remote party, and so forth. Other environmental data that does not belong to the first vehicle 12 may be accumulated from the third data collection zone 22.

Figure 2:
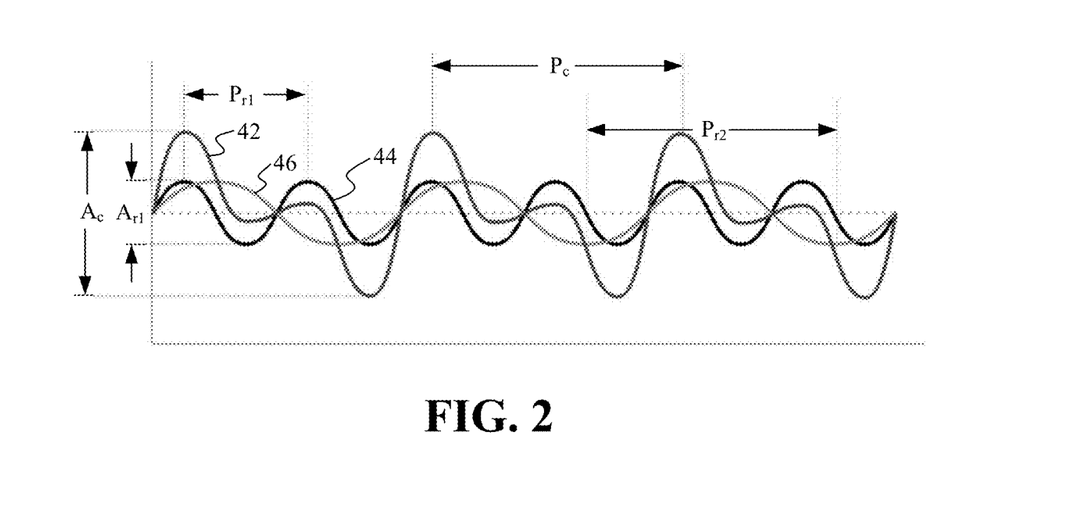
FIG. 2 is a plot of an example of a set of behavior waveforms according to an embodiment.

FIG. 2 shows a plot 40 that demonstrates how data modeling may be implemented based on the interior data, the exterior data and the environmental data. In general, the real-time data from the various sensors and/or sources may be fused into a current behavior waveform 42 that models the current behavior of the driver. The fusing of the data may be conducted on an event basis in which significant events (e.g., sensor signals that are above a particular threshold) are quantified (e.g., counted) and incorporated into the waveform 42. For example, high travel speeds may each increase an amplitude ($A_c$) of the current behavior waveform 42. Moreover, the frequency of the detected events may be reflected in a period ($P_c$) of the waveform 42.

The current behavior waveform 42 may be compared to a first reference behavior waveform 44 that reflects the normal driving behavior of a first reference driver (e.g., Driver A) under similar conditions (e.g., a model having similar weather and/or road conditions). In the illustrated example, an amplitude ($A_{r1}$) of the first reference behavior waveform 44 is substantially less than the amplitude $A_c$ of the current behavior waveform 42, which indicates the presence of more events of concern in the current behavior waveform 42. If the amplitude difference is great enough (e.g., major delta), a safety measure may be automatically triggered to avoid and/or mitigate a collision. Moreover, the safety measure may be tailored to a much more robust set of data (e.g., interior data, exterior data, environmental data) than achievable under conventional isolated solutions.

Similarly, the current behavior waveform 42 may be compared to a second reference behavior waveform 46 that reflects the normal driving behavior of a second driver (e.g., Driver B) under similar conditions. In the illustrated example, a period ($P_{r1}$) of the first reference behavior waveform 44 and a period ($P_{r2}$) of the second reference waveform 46 are both shorter than the period $P_c$ of the current behavior waveform 42. Thus, the normal behavior is more frequent and uniform than the current behavior, in the illustrated example. Again, if the period difference is great enough (e.g., major delta), a safety measure may be automatically triggered to avoid and/or mitigate a collision. Additionally, the safety measure may be tailored to a robust set of data. Appropriate sampler, voltage regulator, amplifier, filter and/or comparator circuitry may be used to sample, generate, scale, smooth and/or compare the behavior waveforms 42, 44, 46.

The reference behavior waveforms 44, 46 may therefore have a different wavelength and frequency for each driver sampled. Additionally, the current behavior waveform 42 may be constantly resampled so that the fidelity of the driver behavior sample improves over time (e.g., as smaller nuances of repeating behavior are incorporated into the base sampling).

The reference behavior waveforms 44, 46 may be averaged and isolated, in order to generate an overlay that will be used to create a differential sampling against which the current driving behavior is evaluated. The waveforms 44, 46 may contain upper and lower thresholds both in wavelength and frequency (+/− standard deviation). Such an approach enables low threshold sampling to be ignored based on the current driving behavior. Accordingly, the illustrated solution deals with minor fluctuations in the driver's behavior and/or minor driver based corrections of the car.

Figure 3:
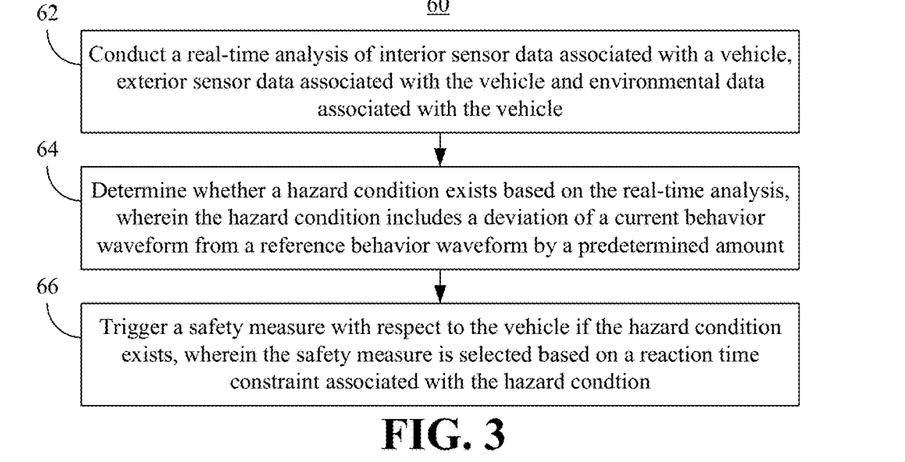
FIG. 3 is a flowchart of an example of a method of operating a semiconductor package apparatus according to an embodiment.

FIG. 3 shows a method 60 of operating a semiconductor package apparatus. The method 60 may generally be implemented in a vehicle such as, for example, the first vehicle 12 (FIG. 1), already discussed. More particularly, the method 60 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 provides for conducting a real-time analysis of interior sensor data associated with a vehicle, exterior sensor data associated with the vehicle and environmental data associated with the vehicle. Block 62 may include communicating with various sensors mounted in and around the vehicle, as well as searching, retrieving and/or receiving the environmental data from one or more remote sources (e.g., servers, cloud computing infrastructure, other vehicles). In addition to acquiring the data, block 62 may involve annotating the data based on location, time, source, etc., or any combination thereof. Moreover, block 62 may automatically evaluate the meaning and/or context of the accumulated data.

For example, the speed of the vehicle, change in wheel angle and the amount of time that the wheel angle remains in the same position may be used to determine whether the driver is currently distracted. Table I below demonstrates an analysis summary.

TABLE I

| Scenario | Speed | Change in Wheel Angle | Time in Same Angle Position |
|---|---|---|---|
| Freeway | ~constant | ~constant & low | normally high |
| Freeway (heavy traffic) | low (25-50 mph) | ~variable | ~variable |
| Freeway ramps | low (25-50 mph) | ~constant & low | normally high |
| City roads/ intersection | low (25-50 mph) | ~constant & low | normally high |
| Distraction | any | normally high | normally low |

A determination may be made at block 64 as to whether a hazard condition exists based on the real-time analysis. In the illustrated example, the hazard condition includes a deviation of a current behavior waveform from a reference behavior waveform by a predetermined amount (e.g., minor delta versus major delta). The deviation may be with respect to amplitude, frequency, etc., or any combination thereof.

A safety measure may be triggered at block 66 with respect to the vehicle if the hazard condition exists, wherein the safety measure may be selected based on a reaction time constraint associated with the hazard condition. The reaction time constraint may generally quantify the sense of urgency presented by the hazard condition. For example, if it is determined that the driver is distracted (e.g., texting, changing the radio station) while no immediate danger is present (e.g., relatively long reaction time constraint), block 66 may generate a notification instructing the driver to pay attention to the road. Thus, the driver may be given the opportunity to take corrective action based on the notification received from the vehicle.

Additional scenarios include: 1) blind spot detection where the driver will be able to manually avoid changing lanes; 2) situations when the driver is backing up and receives notification of objects/humans in the path that are out of the view of the rear camera; 3) situations when the driver is making a turn and is warned to avoid running over a curb that is not visible to the driver.

By contrast, if the driver is distracted while an immediate danger is present (e.g., relatively short reaction time constraint), block 66 may automate one or more maneuvers of the vehicle such as, for example, applying the brakes, steering the vehicle, sounding the horn, etc. Other such scenarios include: 1) the existence of sudden cross traffic by, for example, a deer, car, cat etc.; 2) a chain automobile crash where driver is not aware of the vehicle behind him/her and is unable to take the instant corrective action; 3) an instant lane change due to the vehicle ahead or behind, which might result in a side crash.

Indeed, a combination of driver notification and automated maneuvering may be used. In this regard, the human brain may be considered to be a super computer that reacts quickly to situations. Thus, the combination of approaches may be advantageous when each approach may not sufficient to make the decision on its own. Accordingly, an augmented approach between driver and automobile may take a combined action. Example scenarios include an automobile ahead that is suddenly slowing down or stopped. The vehicle may inform driver, apply the brakes and allow driver to maneuver the steering wheel to steer the car in the correct direction. Such a combined effort may help to quickly lower the speed of the automobile and enable the driver to position the automobile in a safer place.

In yet another example, if it is determined that the driver has not responded to the driver notification (e.g., the driver is still texting), block 66 may generate a remote party notification (e.g., police and/or guardian notification). Indeed, any combination of these or other collision avoidance measures may be taken. As will be discussed in greater detail below, the safety measure may also include a collision mitigation measure if, for example, the collision avoidance measure(s) were unsuccessful.

Figure 4:
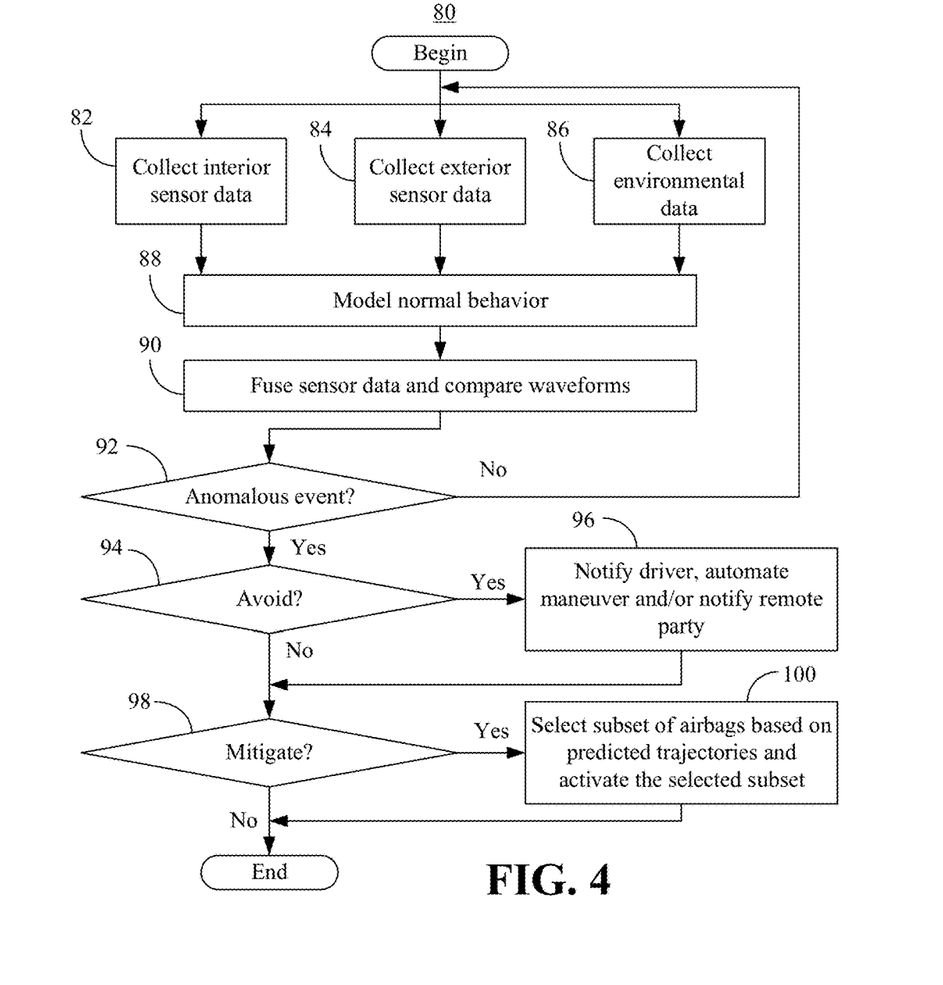
FIG. 4 is a flowchart of an example of a method of avoiding and/or mitigating collisions according to an embodiment.

FIG. 4 shows a method 80 of avoiding and/or mitigating a collision. The method 80 may generally be implemented in a vehicle such as, for example, the first vehicle 12 (FIG. 1), already discussed. More particularly, the method 80 may be implemented as one or more modules in a set of logic instructions stored in a non-transitory machine- or computer-readable storage medium such as RAM, ROM, PROM, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 82 provides for collecting interior sensor data while block 84 collects exterior sensor data and block 86 collects environmental data. Normal behavior may be modeled at block 88 based on the collected data. For example, current road condition and/or traffic data might be used to retrieve historical acceleration data and/or lane position data, wherein the retrieved data may in turn be used at block 88 to generate a reference behavior waveform such as one or more of the reference behavior waveforms 44, 46 (FIG. 2), already discussed. Block 90 may fuse the collected data to obtain a current behavior waveform and compare the current behavior waveform with the reference behavior waveform(s). If an anomalous event (e.g., major delta) is detected at block 92, a determination may be made at block 94 as to whether to trigger a collision avoidance measure. Block 94 may take into consideration the reaction time constraint of the anomalous event. If there is enough time to avoid the collision, illustrated block 96 notifies the driver, automates a maneuver and/or notifies a remote party.

Block 98 may determine whether to trigger a collision mitigation measure. Block 98 may include monitoring for an actual or predicted collision. In order to trigger the collision mitigation measure, illustrated block 100 selects a subset of a plurality of airbags in the vehicle based on predicted trajectories of occupants and/or objects within the vehicle and activates the selected subset of airbags. In this regard, block 100 may take into consideration the actual positions of passengers and loose objects based on the interior sensor data. For example, block 100 might detect a cell phone resting on the dashboard, a person in the back seat, etc., and tailor the airbag deployment to block and/or cushion moving individuals/items within the cabin. If it is determined at block 92 that an anomalous event does not exist, the illustrated method 80 repeats the data collection.

Figure 5:
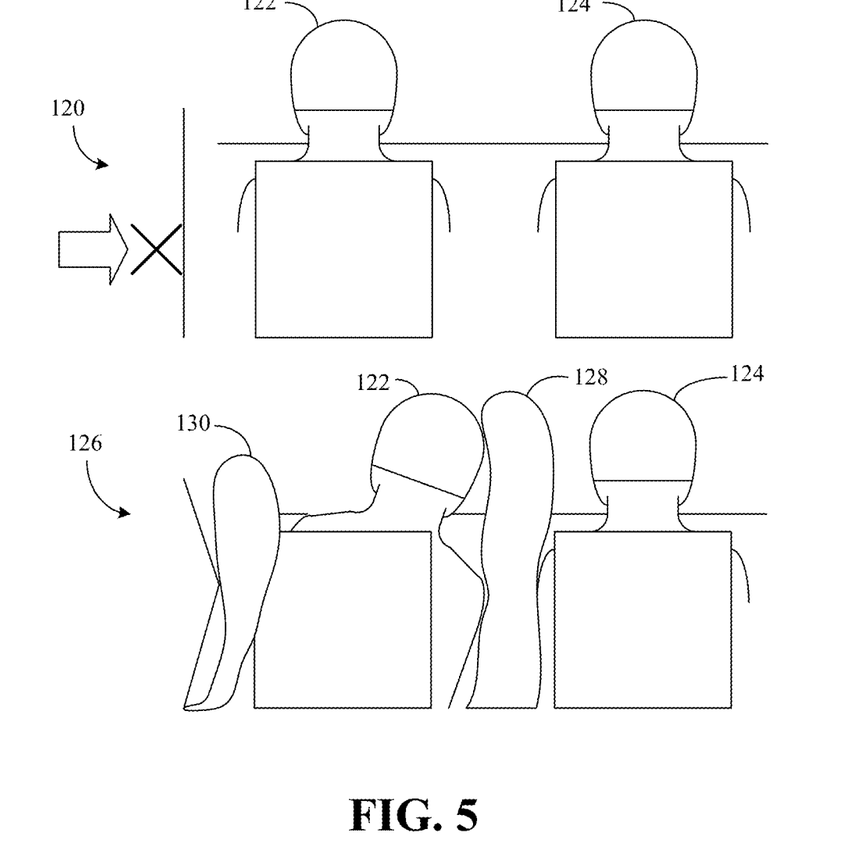
FIGS. 5 and 6 are illustrations of examples of collision mitigations according to embodiments.

For example, FIG. 5 shows a passenger cabin at a pre-collision moment 120, wherein a driver 122 is seated next to a passenger 124. The interior sensor data may indicate the relative position of the driver 122 and the passenger 124 so that the trajectory of the driver 122 may be predicted. Accordingly, at a post-collision moment 126, a console airbag 128 may be deployed between the driver 122 and the passenger 124. Thus, while a door airbag 130 protects the driver 122 from the external impact, the console airbag 128 may protect the passenger 124 from the driver 122, in the illustrated example.

Figure 6:
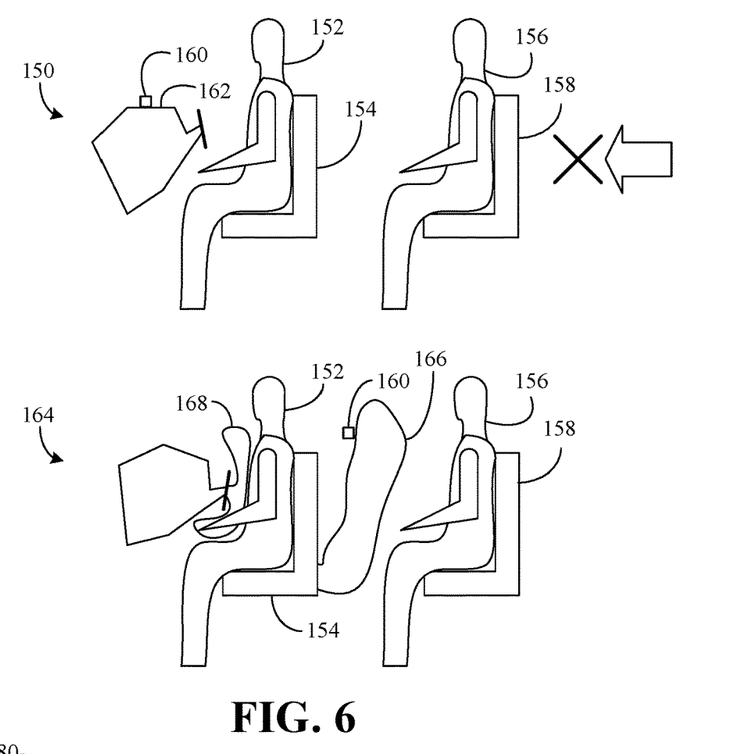

FIG. 6 shows another example of a passenger cabin at a pre-collision moment 150. In the illustrated example, a driver 152 is seated in a front seat 154, a passenger 156 is seated in a back seat 158 and an object 160 (e.g., cell phone, backpack) is resting on a dashboard 162. The interior sensor data may indicate the relative position of the passenger 156 and the object 160 so that the trajectory of the object 160 may be predicted. Accordingly, at a post-collision moment 164, a console airbag 166 may be deployed between the passenger 156 and the object 160. Thus, while a steering wheel airbag 168 protects the driver 122 from the external impact, the console airbag 166 may protect the passenger 156 from the object 160, in the illustrated example.

Figure 7A:
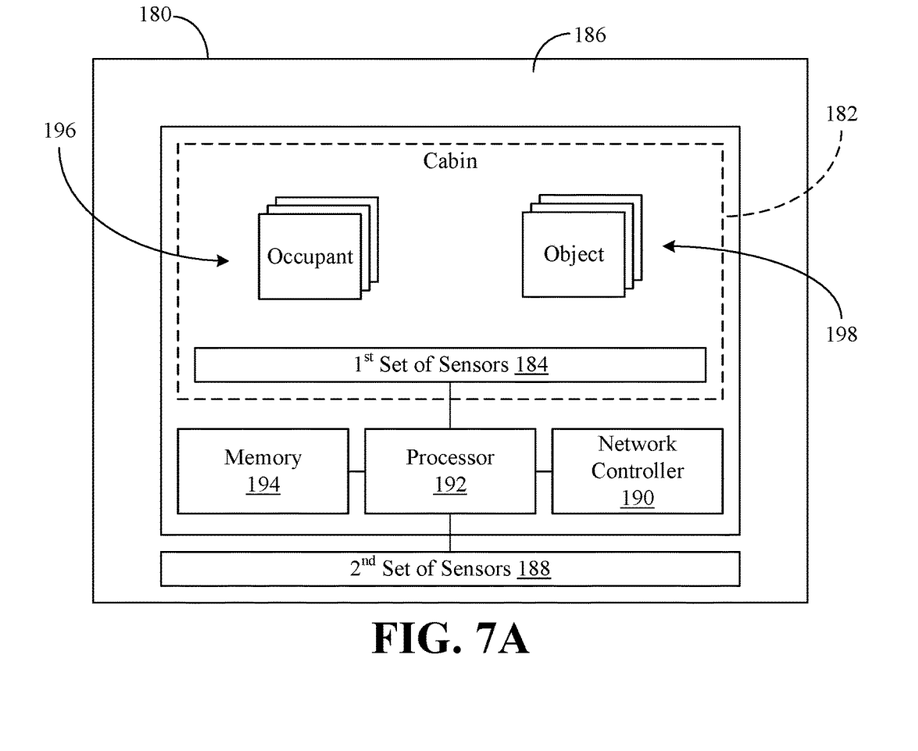
FIG. 7A is a block diagram of an example of a safety-enhanced vehicle according to an embodiment.

Turning now to FIG. 7, a safety-enhanced vehicle 180 is shown. In the illustrated example, the vehicle 180 includes a passenger cabin 182 having a first set of sensors 184 to generate interior sensor data. The interior sensor data may include, for example, driver drowsiness data, seatbelt position data, occupant position data, object position data, driver interface data, occupant weight data, audio tone data, audio volume data, gaze direction data, driver response rate data, etc., or any combination thereof.

The illustrated vehicle 180 also includes a body 186 (e.g., outer shell, protective housing) having a second set of sensors 188 to generate exterior sensor data associated with the vehicle 180. The exterior sensor data may include, for example, travel direction data, acceleration data, velocity data, wheel angle data, gravitational force data, lane position data, proximity data, tilt data, etc., or any combination thereof. Additionally, a network controller 190 may obtain environmental data such as, for example, temperature data, humidity data, dew point data, light data, inter-vehicle communication data, road condition data, traffic data, weather data, natural disaster data, time data, emergency vehicle data, etc., or any combination thereof.

The illustrated vehicle 180 also includes a processor 192 and a memory 194 including instructions, which when executed by the processor 192, cause the vehicle 180 to perform various aspects of the method 60 (FIG. 3) and/or the method 80 (FIG. 4), already discussed. Accordingly, the instructions may cause the vehicle 180 to conduct a real-time analysis of the interior sensor data, the exterior sensor data and the environmental data. For example, the interior sensor data may enable the real-time determination of the relative positions of one or more occupants 196 and one or more objects 198. The instructions may also cause the vehicle 180 to determine whether a hazard condition exists with respect to the occupants 196 based on the real-time analysis. The hazard condition may include, for example, a deviation (e.g., frequency deviation, amplitude deviation) of a current behavior waveform from a reference behavior waveform by a predetermined amount. Additionally, the instructions may cause the vehicle 180 to trigger a safety measure with respect to the vehicle 180 if the hazard condition exists, wherein the safety measure is selected based on a reaction time constraint associated with the hazard condition.

Figure 7B:
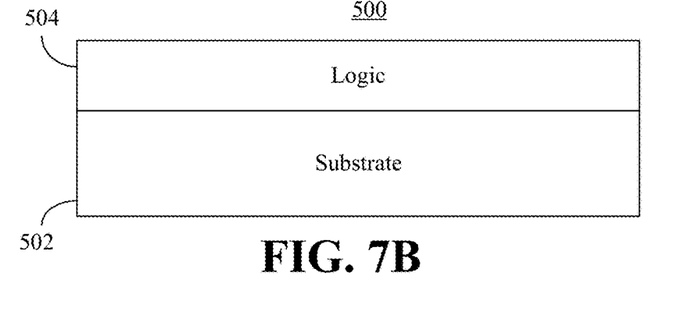
FIG. 7B is an illustration of an example of a semiconductor package apparatus according to an embodiment.

FIG. 7B shows a semiconductor package apparatus 500 (e.g., chip) that includes a substrate 502 (e.g., silicon, sapphire, gallium arsenide) and logic 504 (e.g., transistor array and other integrated circuit/IC components) coupled to the substrate 502. The logic 504, which may be implemented in configurable logic and/or fixed-functionality logic hardware, may generally implement one or more aspects of the method 60 (FIG. 3) and/or the method 80 (FIG. 4), already discussed.

Figure 7C:
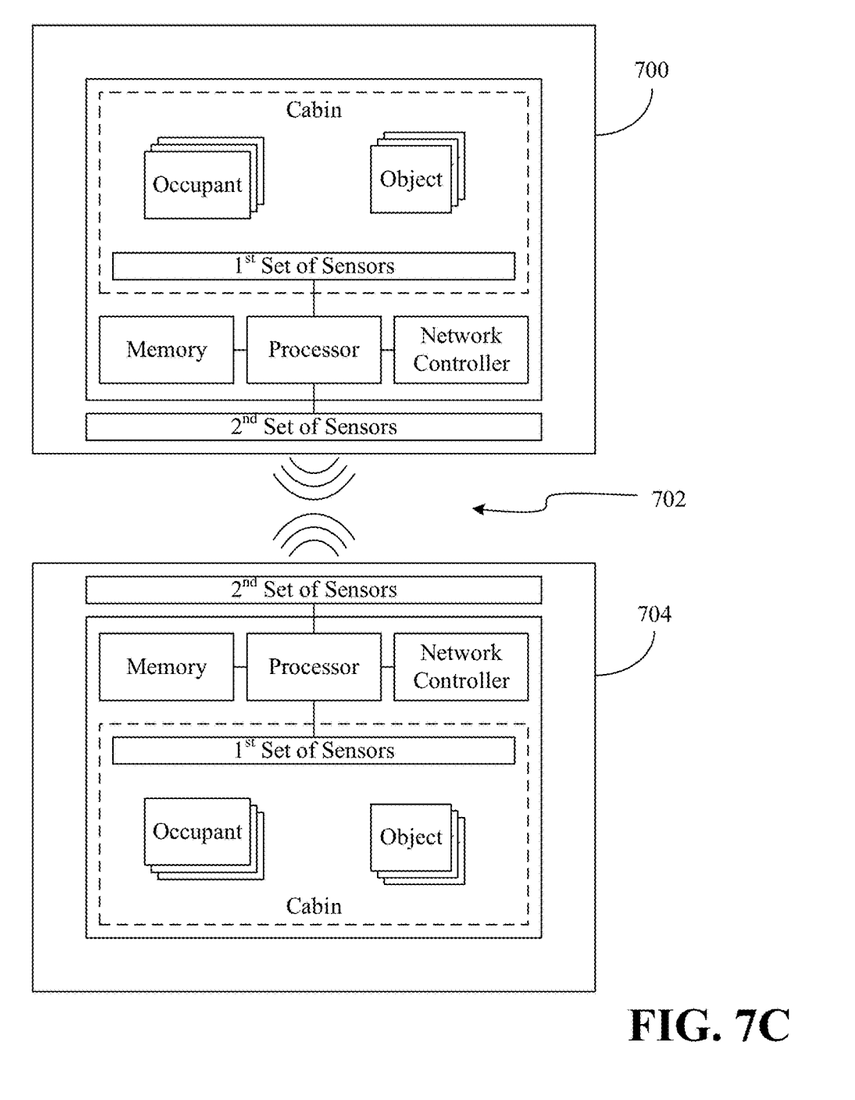
FIG. 7C is a block diagram of an example of a plurality of safety-enhanced vehicles according to an embodiment.

Turning now to FIG. 7C, an inter-vehicle communication scenario in which a first vehicle 700 exchanges proximity-based wireless messages 702 (e.g., NFC messages) with a second vehicle 704. As already noted, the vehicles 700, 704 may subscribe to a proximity-based service that enables the drivers of the vehicles 700, 704 to be made aware of safety concerns. For example, the second vehicle 704 may send an NFC notification to the first vehicle 700 indicating that the driver of the second vehicle 704 is distracted, falling asleep, etc., that there is a mechanical concern with respect to the second vehicle 704 (e.g., bad brakes, faulty turn signal), and so forth. In such a case, the first vehicle 700 may notify the driver of the first vehicle 700, automate a maneuver of the first vehicle 704 (e.g., increase following distance, slow down, change lanes), notify a remote party, etc., or any combination thereof.

Figure 8:
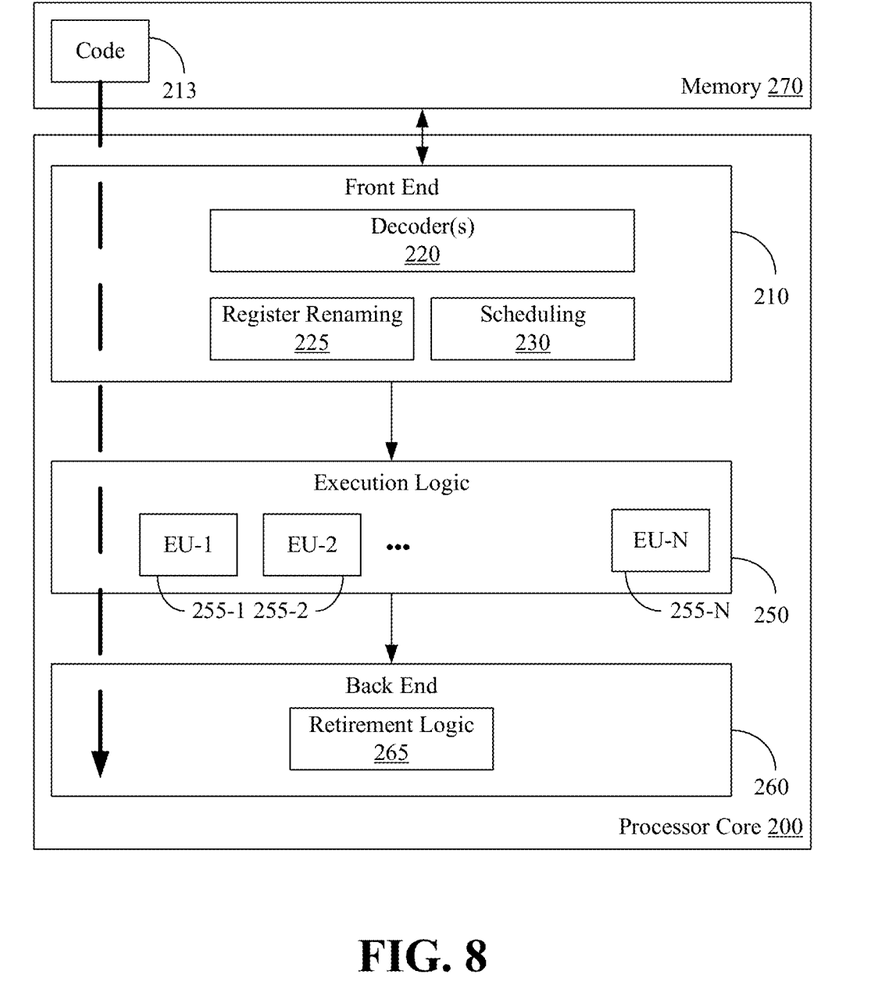
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 60 (FIG. 3) and/or the method 80 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
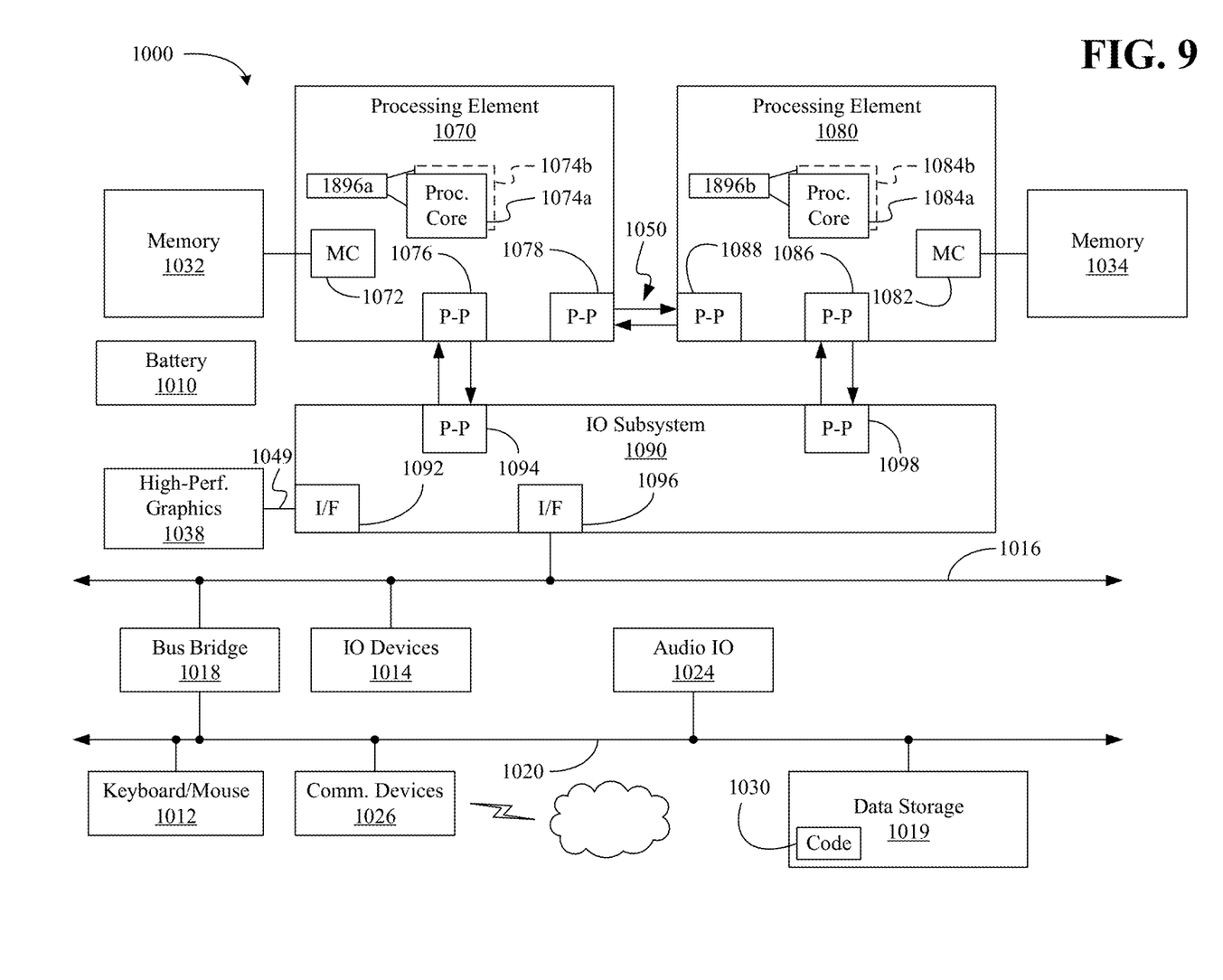
FIG. 9 is a block diagram of an example of a computing system according to an embodiment.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030, which may be similar to the code 213 (FIG. 8), may implement one or more aspects of the method 60 (FIG. 3) and/or the method 80 (FIG. 4), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 may include a safety-enhanced vehicle comprising a passenger cabin including a first set of sensors to generate interior sensor data associated with the vehicle, a body including a second set of sensors to generate exterior sensor data associated with the vehicle, a network controller to obtain environmental data associated with the vehicle, a processor, and a memory including a set of instructions, which when executed by the processor, cause the vehicle to conduct a real-time analysis of the interior sensor data, the exterior sensor data and the environmental data, determine whether a hazard condition exists based on the real-time analysis, wherein the hazard condition is to include a deviation of a current behavior waveform from a reference behavior waveform by a predetermined amount, and trigger a safety measure with respect to the vehicle if the hazard condition exists, wherein the safety measure is to be selected based on a reaction time constraint associated with the hazard condition.

Example 2 may include the vehicle of Example 1, wherein the safety measure is to be a collision avoidance measure that includes one or more of a driver notification, an automated maneuver of the vehicle or a remote party notification.

Example 3 may include the vehicle of Example 1, wherein the safety measure is to include a collision mitigation measure and the instructions, when executed, cause the vehicle to select a subset of a plurality of airbags in the vehicle based on predicted trajectories of occupants within the vehicle, and activate the selected subset.

Example 4 may include the vehicle of Example 1, wherein the deviation is to be one or more of an amplitude deviation or a frequency deviation.

Example 5 may include the vehicle of Example 1, wherein the hazard condition is to correspond to a distracted driver state.

Example 6 may include the vehicle of any one of Examples 1 to 5, wherein the interior sensor data is to include one or more of driver drowsiness data, seatbelt position data, occupant position data, object position data, driver interface data, occupant weight data, audio tone data, audio volume data, gaze direction data or driver response rate data, wherein the exterior sensor data is to include one or more of travel direction data, acceleration data, velocity data, wheel angle data, gravitational force data, lane position data, proximity data or tilt data, and wherein the environmental data is to include one or more of temperature data, humidity data, dew point data, light data, inter-vehicle communication data, road condition data, traffic data, weather data, natural disaster data, time data or emergency vehicle data.

Example 7 may include a semiconductor package apparatus comprising a substrate, and logic coupled to the substrate, wherein the logic is implemented in one or more of configurable logic or fixed-functionality hardware logic, the logic to conduct a real-time analysis of interior sensor data associated with a vehicle, exterior sensor data associated with the vehicle and environmental data associated with the vehicle, determine whether a hazard condition exists based on the real-time analysis, wherein the hazard condition is to include a deviation of a current behavior waveform from a reference behavior waveform by a predetermined amount, and trigger a safety measure with respect to the vehicle if the hazard condition exists, wherein the safety measure is to be selected based on a reaction time constraint associated with the hazard condition.

Example 8 may include the apparatus of Example 7, wherein the safety measure is to be a collision avoidance measure that includes one or more of a driver notification, an automated maneuver of the vehicle or a remote party notification.

Example 9 may include the apparatus of Example 7, wherein the safety measure is to include a collision mitigation measure and the logic is to select a subset of a plurality of airbags in the vehicle based on predicted trajectories of occupants within the vehicle, and activate the selected subset.

Example 10 may include the apparatus of Example 7, wherein the deviation is to be one or more of an amplitude deviation or a frequency deviation.

Example 11 may include the apparatus of Example 7, wherein the hazard condition is to correspond to a distracted driver state.

Example 12 may include the apparatus of any one of Examples 7 to 11, wherein the interior sensor data is to include one or more of driver drowsiness data, seatbelt position data, occupant position data, object position data, driver interface data, occupant weight data, audio tone data, audio volume data, gaze direction data or driver response rate data, wherein the exterior sensor data is to include one or more of travel direction data, acceleration data, velocity data, wheel angle data, gravitational force data, lane position data, proximity data or tilt data, and wherein the environmental data is to include one or more of temperature data, humidity data, dew point data, light data, inter-vehicle communication data, road condition data, traffic data, weather data, natural disaster data, time data or emergency vehicle data.

Example 13 may include a method of operating a semiconductor package apparatus, comprising conducting a real-time analysis of interior sensor data associated with a vehicle, exterior sensor data associated with the vehicle and environmental data associated with the vehicle, determining whether a hazard condition exists based on the real-time analysis, wherein the hazard condition includes a deviation of a current behavior waveform from a reference behavior waveform by a predetermined amount, and triggering a safety measure with respect to the vehicle if the hazard condition exists, wherein the safety measure is selected based on a reaction time constraint associated with the hazard condition.

Example 14 may include the method of Example 13, wherein the safety measure is a collision avoidance measure that includes one or more of a driver notification, an automated maneuver of the vehicle or a remote party notification.

Example 15 may include the method of Example 13, wherein the safety measure is a collision mitigation measure and triggering the safety measure includes selecting a subset of a plurality of airbags in the vehicle based on predicted trajectories of occupants within the vehicle, and activating the selected subset.

Example 16 may include the method of Example 13, wherein the deviation is one or more of an amplitude deviation or a frequency deviation.

Example 17 may include the method of Example 13, wherein the hazard condition corresponds to a distracted driver state.

Example 18 may include the method of any one of Examples 13 to 17, wherein the interior sensor data includes one or more of driver drowsiness data, seatbelt position data, occupant position data, object position data, driver interface data, occupant weight data, audio tone data, audio volume data, gaze direction data or driver response rate data, wherein the exterior sensor data includes one or more of travel direction data, acceleration data, velocity data, wheel angle data, gravitational force data, lane position data, proximity data or tilt data, and wherein the environmental data includes one or more of temperature data, humidity data, dew point data, light data, inter-vehicle communication data, road condition data, traffic data, weather data, natural disaster data, time data or emergency vehicle data.

Example 19 may include at least one non-transitory computer readable storage medium comprising a set of instructions, which when executed by a computing system, cause the computing system to conduct a real-time analysis of interior sensor data associated with a vehicle, exterior sensor data associated with the vehicle and environmental data associated with the vehicle, determine whether a hazard condition exists based on the real-time analysis, wherein the hazard condition is to include a deviation of a current behavior waveform from a reference behavior waveform by a predetermined amount, and trigger a safety measure with respect to the vehicle if the hazard condition exists, wherein the safety measure is to be selected based on a reaction time constraint associated with the hazard condition.

Example 20 may include the at least one non-transitory computer readable storage medium of Example 19, wherein the safety measure is to be a collision avoidance measure that includes one or more of a driver notification, an automated maneuver of the vehicle or a remote party notification.

Example 21 may include the at least one non-transitory computer readable storage medium of Example 19, wherein the safety measure is to include a collision mitigation measure and the instructions, when executed, cause the computing system to select a subset of a plurality of airbags in the vehicle based on predicted trajectories of occupants within the vehicle, and activate the selected subset.

Example 22 may include the at least one non-transitory computer readable storage medium of Example 19, wherein the deviation is to be one or more of an amplitude deviation or a frequency deviation.

Example 23 may include the at least one non-transitory computer readable storage medium of Example 19, wherein the hazard condition is to correspond to a distracted driver state.

Example 24 may include the at least one non-transitory computer readable storage medium of any one of Examples 19 to 23, wherein the interior sensor data is to include one or more of driver drowsiness data, seatbelt position data, occupant position data, object position data, driver interface data, occupant weight data, audio tone data, audio volume data, gaze direction data or driver response rate data, wherein the exterior sensor data is to include one or more of travel direction data, acceleration data, velocity data, wheel angle data, gravitational force data, lane position data, proximity data or tilt data, and wherein the environmental data is to include one or more of temperature data, humidity data, dew point data, light data, inter-vehicle communication data, road condition data, traffic data, weather data, natural disaster data, time data or emergency vehicle data.

Example 25 may include a semiconductor package apparatus comprising means for conducting a real-time analysis of interior sensor data associated with a vehicle, exterior sensor data associated with the vehicle and environmental data associated with the vehicle, means for determining whether a hazard condition exists based on the real-time analysis, wherein the hazard condition is to include a deviation of a current behavior waveform from a reference behavior waveform by a predetermined amount, and means for triggering a safety measure with respect to the vehicle if the hazard condition exists, wherein the safety measure is to be selected based on a reaction time constraint associated with the hazard condition.

Example 26 may include the apparatus of Example 25, wherein the safety measure is to be a collision avoidance measure that includes one or more of a driver notification, an automated maneuver of the vehicle or a remote party notification.

Example 27 may include the apparatus of Example 25, wherein the safety measure is to be a collision mitigation measure and the means for triggering the safety measure includes means for selecting a subset of a plurality of airbags in the vehicle based on predicted trajectories of occupants within the vehicle, and means for activating the selected subset.

Example 28 may include the apparatus of Example 25, wherein the deviation is to be one or more of an amplitude deviation or a frequency deviation.

Example 29 may include the apparatus of Example 25, wherein the is to hazard condition corresponds to a distracted driver state.

Example 30 may include the apparatus of any one of Examples 25 to 29, wherein the interior sensor data is to includes one or more of driver drowsiness data, seatbelt position data, occupant position data, object position data, driver interface data, occupant weight data, audio tone data, audio volume data, gaze direction data or driver response rate data, wherein the exterior sensor data includes one or more of travel direction data, acceleration data, velocity data, wheel angle data, gravitational force data, lane position data, proximity data or tilt data, and wherein the environmental data includes one or more of temperature data, humidity data, dew point data, light data, inter-vehicle communication data, road condition data, traffic data, weather data, natural disaster data, time data or emergency vehicle data.

Thus, technology described herein may include pipeline stages that provide for collecting data, distinguishing between distracted drivers and outside events, determining the appropriate person and/or device to assume control, selecting collision mitigation measures, etc., in a manner that synergistically enhances each stage of the pipeline. For example, comprehensive data collection may reinforce the effectiveness of the real-time analysis, which may in turn result in better safety measure selection.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A vehicle comprising:
a passenger cabin including a first set of sensors to generate interior sensor data associated with the vehicle;
a body including a second set of sensors to generate exterior sensor data associated with the vehicle;
a network controller to obtain environmental data associated with the vehicle;
a processor; and
a memory including a set of instructions, which when executed by the processor, cause the vehicle to:
conduct a real-time analysis of the interior sensor data, the exterior sensor data and the environmental data,
fuse the interior sensor data, the exterior sensor data and the environmental data to obtain a fused current behavior waveform,
determine whether a hazard condition exists based on the real-time analysis, wherein the hazard condition is to include a deviation of the fused current behavior waveform from a reference behavior waveform by a predetermined amount, and
trigger a safety measure with respect to the vehicle if the hazard condition exists, wherein the safety measure is to be selected based on a reaction time constraint associated with the hazard condition.

2. The vehicle of claim 1, wherein the safety measure is to be a collision avoidance measure that includes one or more of a driver notification, an automated maneuver of the vehicle or a remote party notification.

3. The vehicle of claim 1, wherein the safety measure is to include a collision mitigation measure and the instructions, when executed, cause the vehicle to:
select a subset of a plurality of airbags in the vehicle based on predicted trajectories of occupants within the vehicle, and
activate the selected subset.

4. The vehicle of claim 1, wherein the deviation is to be one or more of an amplitude deviation or a frequency deviation.

5. The vehicle of claim 1, wherein the hazard condition is to correspond to a distracted driver state.

6. The vehicle of claim 1, wherein the interior sensor data is to include one or more of driver drowsiness data, seatbelt position data, occupant position data, object position data, driver interface data, occupant weight data, audio tone data, audio volume data, gaze direction data or driver response rate data, wherein the exterior sensor data is to include one or more of travel direction data, acceleration data, velocity data, wheel angle data, gravitational force data, lane position data, proximity data or tilt data, and wherein the environmental data is to include one or more of temperature data, humidity data, dew point data, light data, inter-vehicle communication data, road condition data, traffic data, weather data, natural disaster data, time data or emergency vehicle data.

7. An apparatus comprising:
a substrate; and
logic coupled to the substrate, wherein the logic is implemented in one or more of configurable logic or fixed-functionality hardware logic, the logic to:
conduct a real-time analysis of interior sensor data associated with a vehicle, exterior sensor data associated with the vehicle and environmental data associated with the vehicle;
fuse the interior sensor data, the exterior sensor data and the environmental data to obtain a fused current behavior waveform;
determine whether a hazard condition exists based on the real-time analysis, wherein the hazard condition is to include a deviation of the fused current behavior waveform from a reference behavior waveform by a predetermined amount; and
trigger a safety measure with respect to the vehicle if the hazard condition exists, wherein the safety measure is to be selected based on a reaction time constraint associated with the hazard condition.

8. The apparatus of claim 7, wherein the safety measure is to be a collision avoidance measure that includes one or more of a driver notification, an automated maneuver of the vehicle or a remote party notification.

9. The apparatus of claim 7, wherein the safety measure is to include a collision mitigation measure and the logic is to:
select a subset of a plurality of airbags in the vehicle based on predicted trajectories of occupants within the vehicle; and
activate the selected subset.

10. The apparatus of claim 7, wherein the deviation is to be one or more of an amplitude deviation or a frequency deviation.

11. The apparatus of claim 7, wherein the hazard condition is to correspond to a distracted driver state.

12. The apparatus of claim 7, wherein the interior sensor data is to include one or more of driver drowsiness data, seatbelt position data, occupant position data, object position data, driver interface data, occupant weight data, audio tone data, audio volume data, gaze direction data or driver response rate data, wherein the exterior sensor data is to include one or more of travel direction data, acceleration data, velocity data, wheel angle data, gravitational force data, lane position data, proximity data or tilt data, and wherein the environmental data is to include one or more of temperature data, humidity data, dew point data, light data, inter-vehicle communication data, road condition data, traffic data, weather data, natural disaster data, time data or emergency vehicle data.

13. A method comprising:
conducting a real-time analysis of interior sensor data associated with a vehicle, exterior sensor data associated with the vehicle and environmental data associated with the vehicle;
fusing the interior sensor data, the exterior sensor data and the environmental data to obtain a fused current behavior waveform;
determining whether a hazard condition exists based on the real-time analysis, wherein the hazard condition includes a deviation of the fused current behavior waveform from a reference behavior waveform by a predetermined amount; and
triggering a safety measure with respect to the vehicle if the hazard condition exists, wherein the safety measure is selected based on a reaction time constraint associated with the hazard condition.

14. The method of claim 13, wherein the safety measure is a collision avoidance measure that includes one or more of a driver notification, an automated maneuver of the vehicle or a remote party notification.

15. The method of claim 13 wherein the safety measure is a collision mitigation measure and triggering the safety measure includes:
selecting a subset of a plurality of airbags in the vehicle based on predicted trajectories of occupants within the vehicle; and
activating the selected subset.

16. The method of claim 13, wherein the deviation is one or more of an amplitude deviation or a frequency deviation.

17. The method of claim 13, wherein the hazard condition corresponds to a distracted driver state.

18. The method of claim 13, wherein the interior sensor data includes one or more of driver drowsiness data, seatbelt position data, occupant position data, object position data, driver interface data, occupant weight data, audio tone data, audio volume data, gaze direction data or driver response rate data, wherein the exterior sensor data includes one or more of travel direction data, acceleration data, velocity data, wheel angle data, gravitational force data, lane position data, proximity data or tilt data, and wherein the environmental data includes one or more of temperature data, humidity data, dew point data, light data, inter-vehicle communication data, road condition data, traffic data, weather data, natural disaster data, time data or emergency vehicle data.

19. At least one non-transitory computer readable storage medium comprising a set of instructions, which when executed by a computing system, cause the computing system to:
conduct a real-time analysis of interior sensor data associated with a vehicle, exterior sensor data associated with the vehicle and environmental data associated with the vehicle;
fuse the interior sensor data, the exterior sensor data and the environmental data to obtain a fused current behavior waveform;
determine whether a hazard condition exists based on the real-time analysis, wherein the hazard condition is to include a deviation of the fused current behavior waveform from a reference behavior waveform by a predetermined amount; and
trigger a safety measure with respect to the vehicle if the hazard condition exists, wherein the safety measure is to be selected based on a reaction time constraint associated with the hazard condition.

20. The at least one non-transitory computer readable storage medium of claim 19, wherein the safety measure is to be a collision avoidance measure that includes one or more of a driver notification, an automated maneuver of the vehicle or a remote party notification.

21. The at least one non-transitory computer readable storage medium of claim 19, wherein the safety measure is to include a collision mitigation measure and the instructions, when executed, cause the computing system to:
select a subset of a plurality of airbags in the vehicle based on predicted trajectories of occupants within the vehicle; and
activate the selected subset.

22. The at least one non-transitory computer readable storage medium of claim 19, wherein the deviation is to be one or more of an amplitude deviation or a frequency deviation.

23. The at least one non-transitory computer readable storage medium of claim 19, wherein the hazard condition is to correspond to a distracted driver state.

24. The at least one non-transitory computer readable storage medium of claim 19, wherein the interior sensor data is to include one or more of driver drowsiness data, seatbelt position data, occupant position data, object position data, driver interface data, occupant weight data, audio tone data, audio volume data, gaze direction data or driver response rate data, wherein the exterior sensor data is to include one or more of travel direction data, acceleration data, velocity data, wheel angle data, gravitational force data, lane position data, proximity data or tilt data, and wherein the environmental data is to include one or more of temperature data, humidity data, dew point data, light data, inter-vehicle communication data, road condition data, traffic data, weather data, natural disaster data, time data or emergency vehicle data.

* * * * *